March 7, 1939. S. A. RASMUSSEN 2,149,548
SAFETY FENCE FOR HIGHWAYS
Filed July 16, 1937
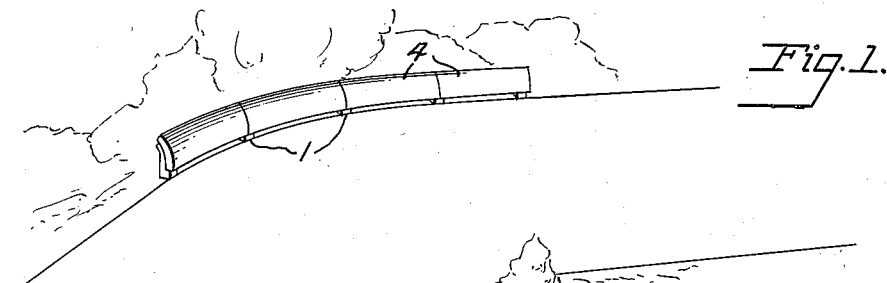
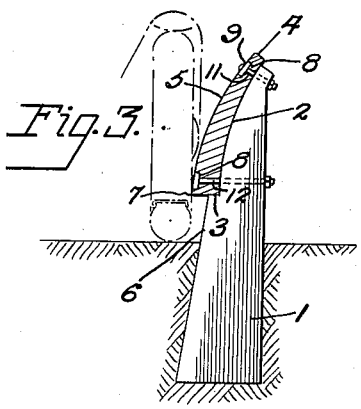
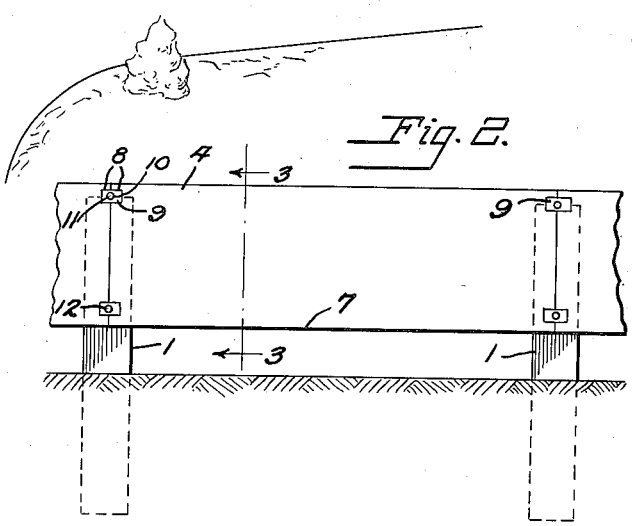
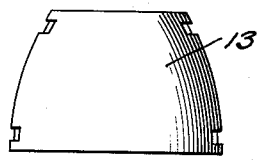
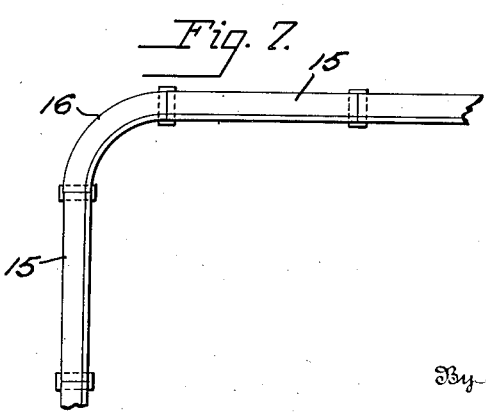
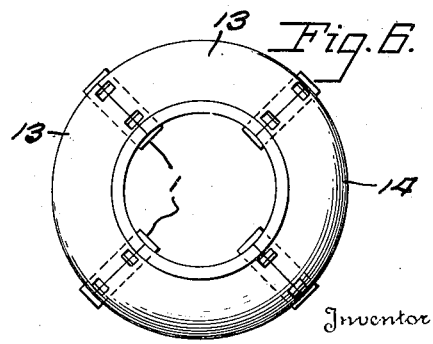
Inventor
S. A. Rasmussen Patented Mar. 7, 1939

2,149,548

UNITED STATES PATENT OFFICE 2,149,548

SAFETY FENCE FOR HIGHWAYS

Svend Aage Rasmussen, Silkeborg, Denmark

Application July 16, 1937, Serial No. 154,055
In Denmark July 20, 1936

3 Claims. (Cl. 256—13.1)

This invention relates to highway safety guards of the fence-type adapted to prevent auto vehicles from leaving the road at curves or dangerous embankments and designed also to fend automobiles off from road obstructions generally.

One of the objects of the invention is to provide a safety fence which include posts and a connecting longitudinal guard rail of arched or channeled cross section, whereby it is given unsurpassable strength in resisting bending.

Another object of the invention is to provide a safety fence with a guard rail spaced from the ground and having an arched contour in vertical planes, with the lower edge of the arch in foremost position toward the traffic lane whereby it will be engaged by the wheel of a vehicle coming off the road, at a point above the base of the tire, minimizing the tendency to overturn the car, the engagement of said edge with the front edge of the wheel forcing the wheel to track with the guard rail, thus bringing the rear edge also of the wheel into contact with the edge of the guard rail, the latter then functioning with braking friction upon both edges of the wheel.

A further object of the invention is the provision of a safety fence as described in which the guard rail flares upwardly and back from the forward lower edge so as to avoid contact with the hub and fenders of the car when performing its normal function of guiding the car to a safe course on the road.

Still another object of the invention is the provision of a safety fence with a vertically arched guard rail in which the surface of the latter affords a field of contact with projecting portions of the auto vehicle such for example as the hub cap or fenders so that should the angular velocity of the automobile when first engaged by the lower foremost edge of the guard rail be sufficient to tilt the car, upwardly shifting fulcra will thus be provided for progressively absorbing the centrifugal tendency of the car to overturn.

A further object of the invention is the provision in a safety fence of the type described of a guard rail formed of rigid arched plates with means for securing them in end to end relation with respect to supporting posts, the invention being characterized by the absence of any obstructive projections against which the car might collide and be thrown out of control.

Still another object of the invention is the embodiment of the inventive principle in plates or guard rails of various size, longitudinal curvature as well as curvature in vertical planes, and in the fabrication of fending units, built up from such plates or guard rails.

Other objects of the invention will appear as the following description of a preferred and practical embodiment thereof proceeds.

In the drawing throughout the several figures of which the same characters of reference have been employed to designate identical parts:

Figure 1 is a perspective view of a safety fence embodying the principles of the present invention arranged at a curve in a highway;

Figure 2 is a side elevation of a section of safety fence showing one of the guard rail plates;

Figure 3 is a cross section taken along the line 3—3 of Figure 2;

Figure 4 is a side elevation of a guard rail plate formed on a 90 degree angle;

Figure 5 is a plan view of the same;

Figure 6 is a fending unit adapted to surround a tree or post built up of four of the 90 degree sections illustrated in Figure 5; and Figure 7 is a modified form of safety fence including straight arched sections and an elbow shaped arched section forming a continuous corner.

Referring now in detail to the several figures, the safety fence comprises a plurality of spaced posts 1 suitably set into the ground, each post being of a shape such as is illustrated in Figure 3, in which the upper side of the post which faces the traffic lane is formed convexly curved as indicated at 2, being rabbeted to form a shoulder 3. The space between adjacent posts is spanned by the guard rail plate 4. Said plate is preferably although not necessarily formed of reinforced concrete and with respect to its opposite sides it is preferably of concavo-convex cross section, the convex or arched side 5 facing the highway. The concave or inner side of the plate 4 fits the curved face 2 of the post 1 and rests thereagainst, the lower edge of the plate 4 being supported upon the shoulders 3.

It will be observed in Figure 3 that the plate 4 is preferably thicker at the base than at the apex, that it projects beyond the face 6 of the post and that it occupies a foremost position toward the traffic lane, the convex face of the plate flaring progressively upwardly and backwardly away from the traffic lane. The lower front edge 7 is the part of the guard rail plate which is normally contacted by the wheel of the vehicle when the latter engages the guard rail and the upper backwardly flared portion is only engaged by the vehicle under extraordinary conditions as where the vehicle starts to overturn.

It will be observed from Figures 2 and 3 that the lower edge of the guard rail plate 4 is spaced from the surface of the highway a sufficient distance to clear the base of the tire of the vehicle wheel and that the lower edge 7 therefore makes contact with the wheel first at the forward edge thereof and then as the wheel is guided into tracking relation with respect to the guard rail, both the front and rear edges of the wheel above the tire engage with the guard rail, the latter impressing a braking friction at both points of contact upon the wheel. Since the guard rail does not contact the tire, but engages the wheel at a distance above the tire, the tendency of the guard rail to overturn the vehicle is minimized. Only after the vehicle wheel strikes the guard rail at a steep angle, and where the angular velocity of the vehicle is sufficiently great will the vehicle start to overturn, then progressively will the hub cap and fenders come into contact with the upper backwardly flared part of the guard rail, these upwardly shifting points of contact affording turning points at or above the center of gravity which will prevent the overturning of the vehicle. Normally when the vehicle wheel scrapes the lower edge of the guard rail plate, the hub cap and fenders will be out of contact with said plate and therefore will not be damaged.

The guard rail is composed of a series of plates 4 arranged in abutment, end to end, the joints occurring preferably midway of the posts 1. Adjacent plates are formed on their convex surface with matching depressions 8 into which a plate 9 is removably seated, said plates being perforated as at 10, Figure 2, for the reception of the bolts 11 and 12 shown in Figure 3 which pass through the material of the posts.

The guard rail plates 4 may be of any shape longitudinally, either straight, for straight sections of the highway where the object of the guard rail is to prevent the auto vehicle from going over dangerous embankments, or curved for use at bends in the road as indicated in Figure 1. Said plates may be made longitudinally with any degree of curvature. In Figures 4 and 5, the plates 13 are shown as being in the form of quadrants of a circle so that four of them arranged in juxtaposition as in Figure 6 form a continuous annular fender 14 to be placed around a pillar or tree.

Figure 7 shows a form of the invention in which a composite safety fence is shown, guarding the abrupt corner of a street or highway. The plates 15 are longitudinally straight while the connecting or corner plate 16 is of 90 degrees arcuate extent.

In a preferred installation of the invention the guard rail will be made light in color so as to be observable at night and serve as a preventive as well as a corrective of unsafe courses of travel of the auto vehicle along the highway.

While I have in the above description disclosed what I believe to be a preferred and practical embodiment of the invention, it will be understood to those skilled in the art that the specific details and arrangement of parts as described are to be regarded as by way of example and not to be construed as limiting the scope of the invention as defined in the appended claims.

What I claim is:

1. Safety fence for highways comprising fixed spaced posts, and a longitudinal guard rail supported by said posts at height above the highway sufficient to clear the base of a tire, said guard rail having its highway-facing side arched convexly in an upward and backward direction, with its lower portion in foremost position toward the highway and projecting beyond those sides of said posts which face the highway.

2. Safety fence for highways comprising fixed spaced posts and a longitudinal guard rail supported by said posts at a height above the highway sufficient to clear the base of a tire, said guard rail comprising a plurality of plates disposed end to end with their joints in planes which intersect said posts, said plates each having the highway-facing side thereof arched convexly in an upward and backward direction, with its lower portion in foremost position toward the highway, the adjacent ends of said plates being formed with matching depressions, retaining plates in said depressions, and bolts passing through said retaining plates and said posts.

3. Safety fence for highways comprising fixed spaced posts, and a longitudinal guard rail supported by said posts at a height above the highway sufficient to clear the base of a tire, said guard rail having its highway-facing side arched convexly in an upward and backward direction, with its lower portion in foremost position toward the highway and projecting beyond those sides of said posts which face the highway, said guard rail being formed of abutting plates, the adjacent ends of said plates being formed with matching depressions, retaining plates in said depressions, and bolts passing through said retaining plates and said posts.

SVEND AAGE RASMUSSEN.